Aug. 10, 1937.                J. H. HOWARD                 2,089,481
                          METHOD FOR FACING TOOLS
                            Filed Feb. 4, 1935
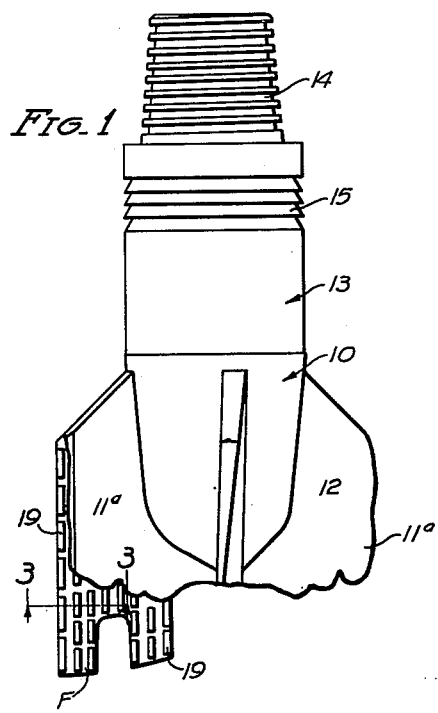
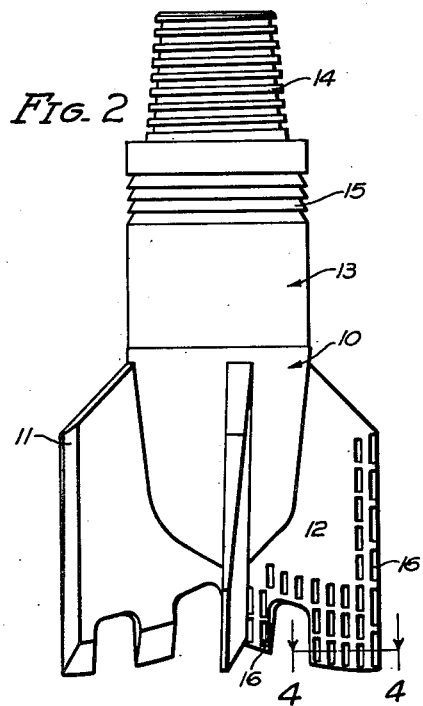
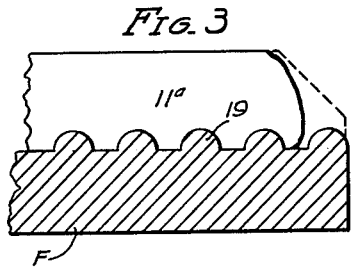
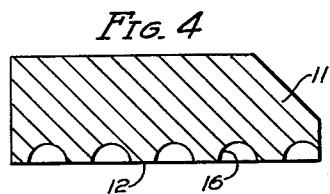
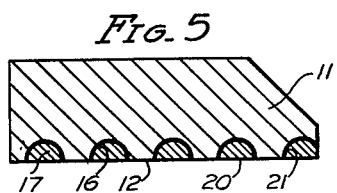
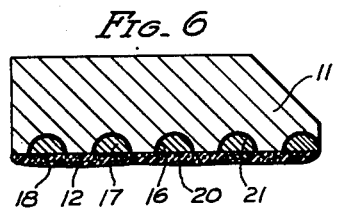
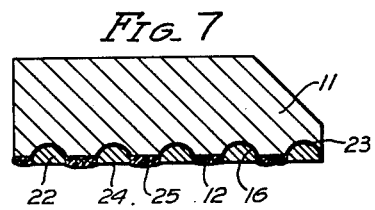
INVENTOR
JOHN H. HOWARD
PER
ATTORNEY Patented Aug. 10, 1937

2,089,481

UNITED STATES PATENT OFFICE 2,089,481

METHOD FOR FACING TOOLS

John H. Howard, Huntington Park, Calif.

Application February 4, 1935, Serial No. 4,847

5 Claims. (Cl. 76—108)

This invention relates to the manufacture and repair of tools and has particular reference to a method for facing tools with hard material. A general object of the invention is to provide a simple, inexpensive and commercially practical method of providing a tool with hard wear taking and cutting material.

Certain classes of tools, such as well drilling tools, have their active or cutting faces provided with inserts or pieces of hard material such as tungsten carbide and the like. In the manufacture and repair of such tools it has been the common practice to weld the inserts or hard bodies to the tools and to sometimes build up faces on the tools by welding around the inserts or hard bodies. It is very difficult to definitely position the hard inserts in the proper locations on the tools by the welding method and the inserts are often cracked and otherwise injured by the high temperatures to which they are subjected during the welding operation.

Another object of this invention is to provide a method for making a tool whereby pieces or inserts of hard material may be definitely positioned in the face of the finished tool.

Another object of the invention is to provide a method for making a tool faced with inserts or bodies of hard cutting material by which the inserts or hard bodies are securely and dependably held in position on the cutting parts of the tool without resorting to welding, and, therefore, without subjecting the inserts or hard bodies to excessive temperatures.

Another object of the invention is to provide a practical method for making a tool from which the unworn and remaining bodies of hard cutting material may be readily salvaged or recovered in the event that the worn tool is not being re-used or repaired.

Another object of the invention is to provide a method for producing a tool having inserts or bodies of hard cutting material in its cutting faces and having a facing layer which cushions the hard bodies against shocks and reinforces them against fracturing and displacing strains.

Another object of the invention is to provide a method for repairing a worn tool that provides the tool with definitely positioned bodies of hard cutting material and a relatively hard wear taking layer on the active face of the renewed or built up portion of the tool to restore the original wearing and cutting qualities of the tool.

The various objects and features of my invention will be fully understood from the following detailed description of typical preferred manners of carrying out the method, throughout which description reference may be made to the accompanying drawing, in which:

Fig. 1 is a side elevation of a worn well drill showing a form in position on one of the blades for the purpose of building up or restoring the blade. Fig. 2 is a side elevation of the body of the drill as originally formed. Fig. 3 is an enlarged fragmentary horizontal sectional view taken substantially as indicated by line 3—3 on Fig. 1. Fig. 4 is an enlarged fragmentary horizontal detailed sectional view taken as indicated by line 4—4 on Fig. 2. Fig. 5 is a view similar to Fig. 4 showing the inserts or hard bodies brazed in the grooves in the blade. Fig. 6 is a view similar to Fig. 5 showing the layer brazed in position on the face of the blade to cover the inserts and Fig. 7 is a view similar to Fig. 6 illustrating a blade formed in accordance with a modified or alternative manner of carrying out the invention.

The method provided by this invention is adapted to be employed in the manufacture and repair of tools of various characters employed for various purposes. The method is particularly adapted for the production and repair of well drilling tools and I will proceed with a detailed description of typical manners of carrying out the invention in the manufacture and repair of a more or less typical well drilling bit, it being understood that the invention is not to be construed as limited to the specific application or details about to be described.

In Fig. 2 of the drawing I have illustrated a well drilling bit whose blades or cutting parts are to be faced or prepared in accordance with the invention and in Fig. 1 of the drawing I have illustrated the worn body of the same drill or a similar drill to be repaired and refaced in accordance with the invention. The drill illustrated in the drawing includes a body 10 having a plurality of downwardly and outwardly projecting cutting blades 11. The forward or active faces 12 of the blades 11 are substantially flat and of considerable area. The lower edges or ends of the blades 11 are toothed or notched. As far as the present invention is concerned the several blades 11 of the bit may be considered as alike or identical. A shank 13 carries the body 10 and is provided at its upper end with a threaded pin 14 for facilitating the connection of the drill with an operating string or well drilling string. A series of ribs or wickers 15 is provided on the shank 13 to make it readily engageable by a facing tool in the event that the drill is lost in a well.

The method of the invention as carried out in accordance with the disclosure in Figs. 1 to 6, inclusive, of the drawing, includes, generally, the forming or providing of a plurality of grooves 16 in the active faces 12 of the drill, the brazing of inserts or bodies 17 of hard cutting material in the grooves 16 and the providing of a relatively hard layer or wear taking facing layer 18 on each of the faces 12.

The openings or grooves 16 are provided in the faces 12 of the blades 11 to receive and carry the hard bodies 17. In accordance with the broader aspects of the invention the grooves 16 may be formed in any desirable manner. In practice the grooves 16 may be cast or forged in the active faces of the blades 11 as the tool is originally formed. In some instances it may be practical or desirable to cut or mill the grooves 16 in the active faces 12 of the tool. The grooves 16 are thoroughly cleaned, as by sand blasting, pickling or the like, to properly receive the inserts or hard bodies 17.

The invention provides a novel and effective manner of providing the grooves 16 in the worn away blades 11 of a tool when such blades are being repaired or built up. In carrying out the method in the repair of a worn away blade 11 a form F is arranged against the forward or active face 12 of the remaining portion 11ᵃ of the blade. The face of the remaining portion 11ᵃ of the blade is cleaned and the remaining hard bodies 17 are removed from the grooves 16 therein, in a manner to be hereinafter described, before arranging the form F in position on the blade. Figs. 1 and 3 of the drawing illustrates a form F arranged in the proper position against the forward face of the remaining part 11ᵃ of a cutting blade. The form F is of copper or the like and has ribs 19 on its inner side. The ribs 19 may correspond in size, shape and location to the grooves 16 originally provided in the blade. Certain of the ribs 19 may be fitted in the grooves 16 in the remaining portion 11ᵃ of the blade to properly position the form F. After locating or positioning the form F as just described the worn away portion of the blade is replaced or rebuilt with steel by means of an electric arc, acetylene torch or by other means of replacing metal. As the metal is replaced on the worn blade against the form F the ribs 19 act as core elements to provide or form the grooves 16 in the forward face of the built up or repaired blade. The grooves 16 thus formed in the forward face of the repaired blade are in the proper locations and may be in the same positions as the grooves in the blade as originally formed.

The grooves 16, whether formed in the original blades 11 or in the repaired blades may bear any desired relation to one another. In the particular case illustrated a plurality of parallel rows of spaced grooves 16 is provided in the forward face 12 of each blade 11. The outermost rows of grooves 16 may be immediately adjacent the outer edges of the blades 11. The grooves 16 illustrated in the drawing are substantially semi-circular in horizontal cross section, it being understood that the shape of the grooves 16 depends upon the shape of the inserts or hard bodies 17 to be arranged in the grooves.

The invention includes the step of brazing the hard bodies or inserts 17 in the grooves 16 to dependably secure them to the cutting parts or blades 11. As previously described, the grooves 16 are shaped to properly receive the hard bodies 17. In the structure illustrated in the drawing the inserts or hard bodies 17 have substantially cylindrically curved inner surfaces to substantially conform to the walls of the grooves 16. The hard bodies 17 are elongate having flat opposite ends to abut or oppose the opposite ends of the grooves 16. The outer sides 20 of the inserts or hard bodies 17 are preferably flat to be substantially flush with the faces 12 when the inserts are brazed in the grooves. In accordance with the invention comparatively thin layers 21 of bronze, copper or other brazing material are interposed or occur between the walls of the groove 16 and the opposing surfaces of the hard bodies 17 to secure or braze the bodies to the blades 11. The grooves 16 hold or support the hard bodies 17 against displacement and fracturing and definitely position or locate the hard bodies in the active faces of the blades 11. It is to be understood that the act of brazing the hard bodies 17 to the blades 11 does not subject the inserts or hard bodies to excessive temperatures. The inserts or hard bodies 17 in the outermost rows of grooves 16 are adjacent the edges of the blades 11 of the finished tool.

The final act or step of the invention comprises the provision of wear taking and reinforcing faces or layers 18 on the faces 12 of the cutting blades 11. The layers 18 are formed of copper, bronze or other brazing material and have embedded or cast in them relatively small pieces of tungsten carbide or other hard material. The layers 18 are brazed on the forward faces 12 of the blades 11 to cover the hard inserts 17. In practice the layers 18 may extend over or cover the entire active or forward surfaces of the blades 11. The wear taking and reinforcing blades or layers 18 may be formed as they are brazed on the faces 12 or may be preformed and brazed on the faces, the latter method having the advantage that the layers 18 in being preformed are uniform in thickness and have substantially regular surfaces. The facing layers 18 brazed to the faces 12 and the outer sides 20 of the hard bodies 17 operate to cushion the shocks imposed on the hard bodies and reinforce the bodies against fracturing and displacing shocks and wear as the blades 11 wear away to expose the bodies 17 at their edges.

Fig. 7 of the drawing illustrates a cutting part or blade 11 faced in accordance with a variation of the invention. A plurality of spaced grooves 16 is provided in the forward face 12 of the blade 11 in the manner described above. The cutting part or blade 11 may be considered as a new blade as originally formed or a built up or repaired blade formed in the manner set forth above. In accordance with the invention bodies 22 of hard cutting material are brazed in the grooves 16. The grooves 16 are partially cylindrical in their transverse cross section and the hard bodies 22 have cylindrically curved inner surfaces. Brazing 23 effectively holds the bodies 22 in the grooves 16. In accordance with the form of the invention being described the inserts or hard bodies 22 project outwardly from the grooves 16 beyond the face 12. The hard bodies 22 may have flat outer surfaces 24 substantially parallel with the face 12.

Following the brazing of the inserts or bodies 22 in the grooves 16 the grooves or spaces between the adjacent projecting portions of the bodies 22 are filled in by brazing therein a mixture 25 of small pieces of hard material and a binder of copper, bronze or the like. The spaces between the adjacent hard bodies 22 are filled in by the mixture 25 so that the outer surfaces of the layer formed by the mixture 25 is substantially flush with the outer surfaces 24 of the bodies 22. The layer formed by the mixture 25 acts to more effectively secure the hard bodies 22 to the blade 11 and reinforce the hard bodies against fracturing and displacement. It will be noted that where the invention is carried out as illustrated in Fig. 7 the outer active surface of the blade 11 is substantially straight and is uniform in character having the outer surfaces of hard bodies at its face.

The bodies 17 or 22 of hard cutting material may be readily removed from a tool made in accordance with the present invention by heating the tool to a temperature above the melting point of the brazing material or by heating the faces of the cutting parts to melt the brazing material. When the tool is treated in either of these manners the hard cutting bodies fall from the grooves or may be readily removed. The inserts or hard bodies 17 and 22 recovered in this manner may be re-used. Preparatory to repairing the cutting parts or blades 11 of a drill the remaining facing layers and the bodies of hard cutting material may be removed from the remaining portions of the blades in the manner just described to allow the form F to be properly positioned on the blades so that they may be built up or repaired. In some instances it may be economical to only remove the portions of the facing layers and the inserts adjacent the worn edges of the blades. In such cases the form F would be positioned to extend over only a relatively small portion of each of the blades being repaired. A tool made in accordance with the invention may be easily and inexpensively repaired and reconditioned for further use.

The present invention provides a simple, economical method of facing a tool with inserts of hard material which does not subject the inserts to damaging temperatures. Further, the hard bodies or inserts may be accurately or definitely positioned and the wear taking face or faces of the tool may be uniform and of the desired configuration.

Having described only typical preferred applications and manners of carrying out the method of my invention I do not wish to be limited or restricted to the specific details set forth, but wish to reserve to myself any changes or variations that may appear to those skilled in the art or fall within the scope of the following claims.

Having described my invention, I claim:

1. The method of repairing a worn cutting part which includes positioning a form at the cutting part having projections, adding metal to the part to replace its worn away portion, the form constituting a matrix for the added metal whereby its projections produce recesses in the face of the added on portion, and then fixing pieces of hard material in the recesses.

2. The method of repairing a worn cutting part which includes positioning a form at the cutting part having projections, adding metal to the part to replace its worn away portion, the form constituting a matrix for the added metal whereby its projections produce recesses in the face of the added on portion, and then brazing bodies of hard material in the recesses.

3. The method of repairing a worn cutting part which includes positioning a form at the cutting part having projections, adding metal to the part to replace its worn away portion, the form constituting a matrix for the added metal whereby its projections produce recesses in the face of the added on portion, brazing bodies of hard material in the recesses, and then brazing a facing layer on said face.

4. The method of repairing a worn well tool comprising positioning a form at the tool having projections, adding metal to the worn portion of the tool so that the form constitutes a matrix for the added metal and its projections produce recesses in the face of the tool presented by the added on portion, fixing pieces of hard metal in the recesses, and then fixing a facing layer on the said face of the tool.

5. The method of repairing a worn well tool having a groove in its face comprising providing a form having a projection, arranging the form at the worn portion of the tool so that its projection is aligned with the groove in the remaining part of the tool, adding metal to the tool to replace its worn away portion, the form constituting a matrix for the added metal and its projection forming a groove in the added metal, and then fixing hard material in the grooves.

JOHN H. HOWARD.